US012440321B2

(12) United States Patent
Schaefer

(10) Patent No.: US 12,440,321 B2
(45) Date of Patent: Oct. 14, 2025

(54) ATTACHMENT FOR AN ORAL CARE DEVICE HANDLE

(71) Applicant: Braun GmbH, Kronberg (DE)

(72) Inventor: Norbert Schaefer, Frankfurt am Main (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 19/175,653

(22) Filed: Apr. 10, 2025

(65) Prior Publication Data

US 2025/0235299 A1 Jul. 24, 2025

Related U.S. Application Data

(63) Continuation of application No. 18/390,257, filed on Dec. 20, 2023, now Pat. No. 12,036,079, which is a (Continued)

(30) Foreign Application Priority Data

Jan. 31, 2022 (EP) .................................... 22154227

(51) Int. Cl.
*A61C 17/22* (2006.01)
*A46B 5/00* (2006.01)
(Continued)

(52) U.S. Cl.
CPC .......... *A61C 17/222* (2013.01); *A46B 5/0095* (2013.01); *A46B 13/02* (2013.01); *F16D 1/02* (2013.01)

(58) Field of Classification Search
CPC ...... A61C 17/222; A46B 5/0095; A46B 13/02
See application file for complete search history.

(56) References Cited

U.S. PATENT DOCUMENTS 5,406,664 A 4/1995 Hukuba
7,150,061 B2 12/2006 Kwong
(Continued)

FOREIGN PATENT DOCUMENTS

CN 1161643 A 10/1997
CN 2496419 Y 6/2002
(Continued)

OTHER PUBLICATIONS

All Office Actions; U.S. Appl. No. 14/314,414, filed Jun. 25, 2014.
(Continued)

*Primary Examiner* — Shay Karls
(74) *Attorney, Agent, or Firm* — Jay A. Krebs

(57) ABSTRACT

An oral care device attachment for being coupled to an oral care device handle having an essentially cylindrical drive shaft coupling end. The attachment has an outer attachment tube having a coupling end for being detachably secured at a housing of the device handle. A carrier is mounted for driven motion at the outer attachment tube. A motion transmitter is disposed inside the outer attachment tube and has a first end coupled with the carrier and a second end arranged for coupling with the essentially cylindrical drive shaft coupling end. The second end has a coupling unit having a top plate and at least one at least partly deformable and essentially cylindrical wall element extending from the top plate, or at least two elastic or deflectable wall elements extending from the top plate, respectively. Each of the elastic or deflectable wall elements extends over a portion of a virtual receiver cylinder, so that an essentially cylindrical receiver receptacle is defined by the top plate and the one at least partly deformable essentially cylindrical wall element or by the top plate and the at least two elastic or deflectable wall elements.

30 Claims, 15 Drawing Sheets

Related U.S. Application Data continuation of application No. 18/103,553, filed on Jan. 31, 2023.

(51) Int. Cl.
*A46B 13/02* (2006.01)
*F16D 1/02* (2006.01)

(56) References Cited

U.S. PATENT DOCUMENTS

| | | |
|---|---|---|
| 8,336,155 B2 | 12/2012 | Crossman et al. |
| 8,631,532 B2 | 1/2014 | Utsch et al. |
| 9,358,088 B2 | 6/2016 | Schaefer et al. |
| 9,439,742 B2 | 9/2016 | Shimoyama et al. |
| 9,724,181 B2 | 8/2017 | Schaefer et al. |
| 10,660,733 B2 | 5/2020 | Schaefer et al. |
| 12,036,079 B2 | 7/2024 | Schaefer |
| 2004/0049868 A1 | 3/2004 | Ng |
| 2005/0011022 A1 | 1/2005 | Kwong |
| 2009/0007357 A1 | 1/2009 | Meadows et al. |
| 2009/0019651 A1 | 1/2009 | Grez et al. |
| 2010/0263147 A1 | 10/2010 | Crossman et al. |
| 2010/0269275 A1 | 10/2010 | Shimoyama et al. |
| 2011/0083288 A1 | 4/2011 | Kressner |
| 2012/0010049 A1 | 1/2012 | Amalaha |
| 2013/0060176 A1 | 3/2013 | Nichols |
| 2013/0340184 A1 | 12/2013 | Fritsch |
| 2014/0101872 A1 | 4/2014 | Utsch et al. |
| 2018/0368562 A1 | 12/2018 | Fritsch |
| 2019/0246779 A1 | 8/2019 | Jungnickel et al. |
| 2020/0022793 A1 | 1/2020 | Scherrer et al. |
| 2020/0315758 A1 | 10/2020 | Papazian |
| 2021/0153990 A1 | 5/2021 | Gacitùa Cavagnaro |
| 2023/0240823 A1 | 8/2023 | Schaefer |
| 2023/0301423 A1 | 9/2023 | Ruan |

FOREIGN PATENT DOCUMENTS

| | | |
|---|---|---|
| CN | 2561266 Y | 7/2003 |
| CN | 1764423 A | 4/2006 |
| CN | 1808863 A | 7/2006 |
| CN | 101511301 A | 8/2009 |
| CN | 202875521 U | 4/2013 |
| CN | 103717177 A | 4/2014 |
| CN | 103732180 A | 4/2014 |
| CN | 204655171 U | 9/2015 |
| CN | 204655172 U | 9/2015 |
| CN | 103654987 B | 8/2016 |
| CN | 205586105 U | 9/2016 |
| CN | 105997286 A | 10/2016 |
| CN | 205866876 U | 1/2017 |
| CN | 110251255 A | 9/2019 |
| CN | 216148260 U | 4/2022 |
| CN | 219782796 U | 10/2023 |
| DE | 202023104135 U1 | 8/2023 |
| EP | 0977521 B1 | 12/2003 |
| EP | 2550938 A1 | 1/2013 |
| EP | 2550940 B1 | 8/2014 |
| EP | 3616649 B1 | 12/2022 |
| EP | 4218666 A1 | 8/2023 |
| EP | 4248909 A2 | 9/2023 |
| GB | 2319466 B | 1/2001 |
| JP | S4955268 U | 5/1974 |
| JP | 3124430 U * | 8/2006 |
| JP | 2007525265 A | 9/2007 |
| JP | 2008080099 A | 4/2008 |
| JP | 2010504775 A | 2/2010 |
| JP | 2010535080 A | 11/2010 |
| JP | 2011177277 A | 9/2011 |
| JP | 4998012 B2 | 5/2012 |
| JP | 2012214623 A | 11/2012 |
| JP | 2013535307 A | 9/2013 |
| JP | 3243768 U | 9/2023 |
| KR | 100242145 B1 | 3/2000 |
| KR | 100314114 B1 | 11/2001 |
| KR | 20110033218 A | 3/2011 |
| WO | 2006004316 A1 | 1/2006 |
| WO | 2013014616 A1 | 1/2013 |
| WO | 2018085484 A1 | 5/2018 |
| WO | 2021071653 A1 | 4/2021 |

OTHER PUBLICATIONS

All Office Actions; U.S. Appl. No. 14/700,296, filed Apr. 30, 2015.
All Office Actions; U.S. Appl. No. 15/639,489, filed Jun. 30, 2017.
All Office Actions; U.S. Appl. No. 18/103,553, filed Jan. 31, 2023.
All Office Actions; U.S. Appl. No. 18/390,257, filed Dec. 20, 2023.
All Office Actions; U.S. Appl. No. 90/019,808, filed Jan. 13, 2025.
EPO Office Action for 22154227.7 dated Mar. 11, 2024, 05 pages.
EPO Search Report and Opinion for 22154227.7 dated Jul. 5, 2022; 10 pages.
PCT Search Report and Written Opinion for PCT/IB2023/050683 dated Mar. 30, 2023, 14 pages.
U.S. Appl. No. 90/019,808, filed Jan. 13, 2025, to Norbert Schaefer.

* cited by examiner

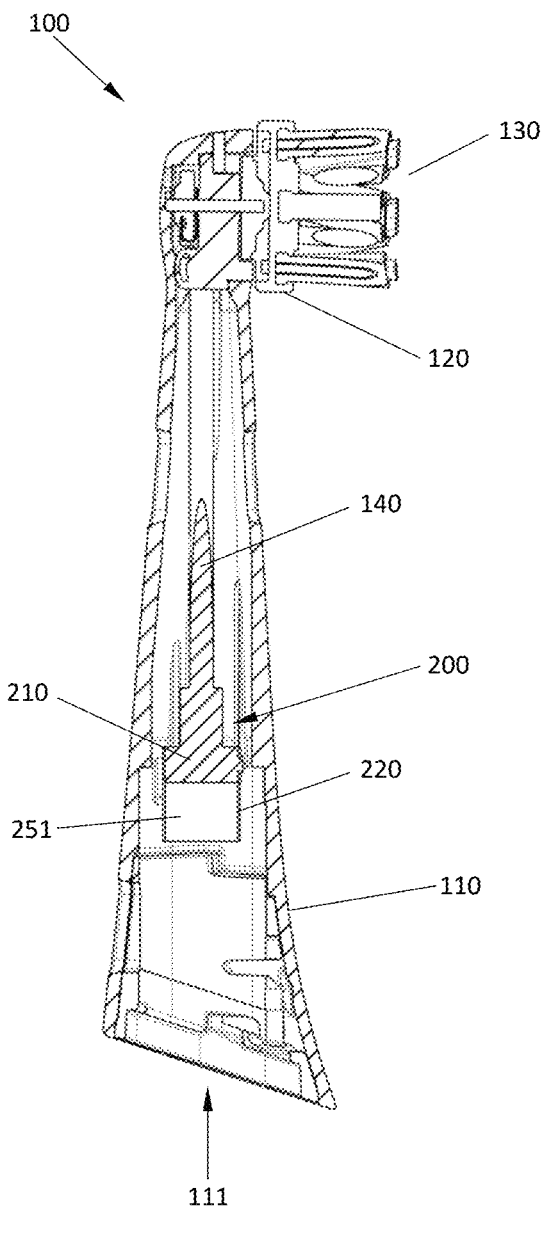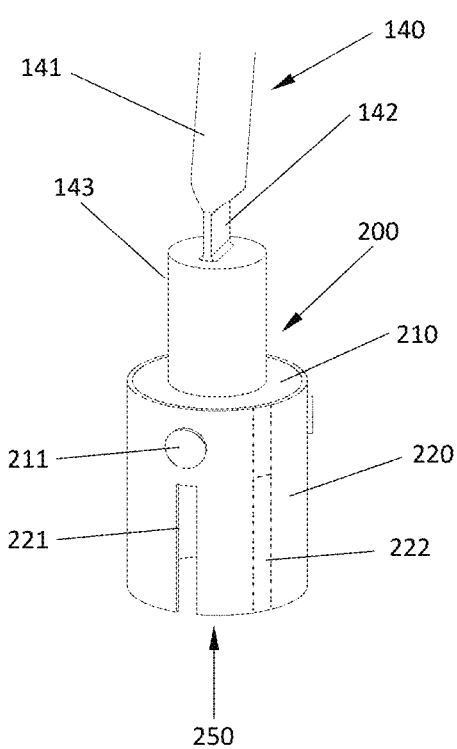
Fig. 4A
Fig. 4B

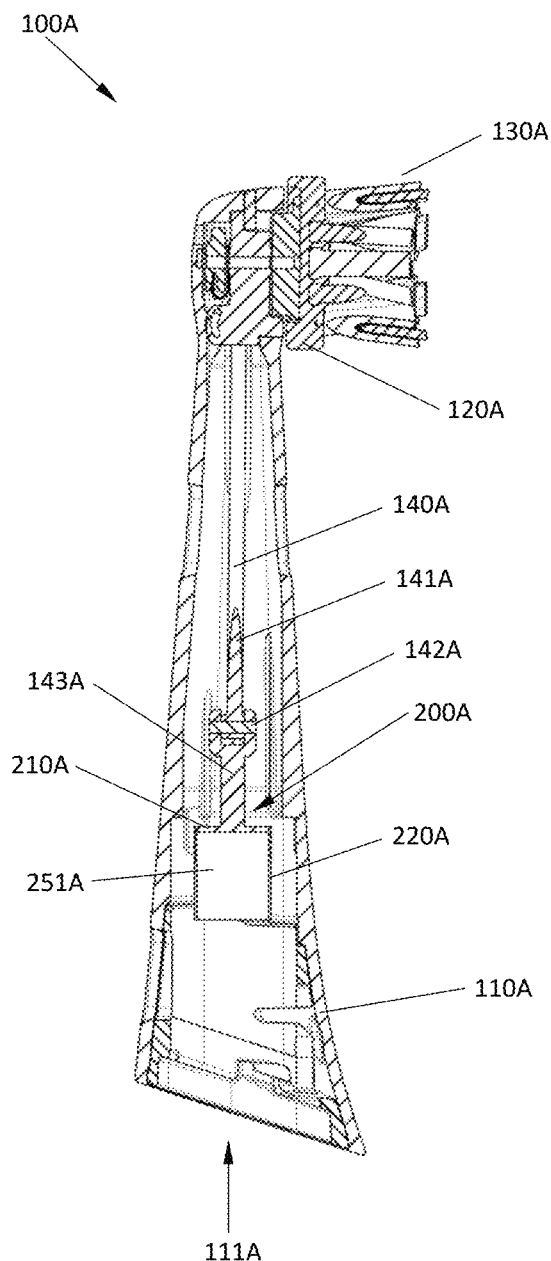
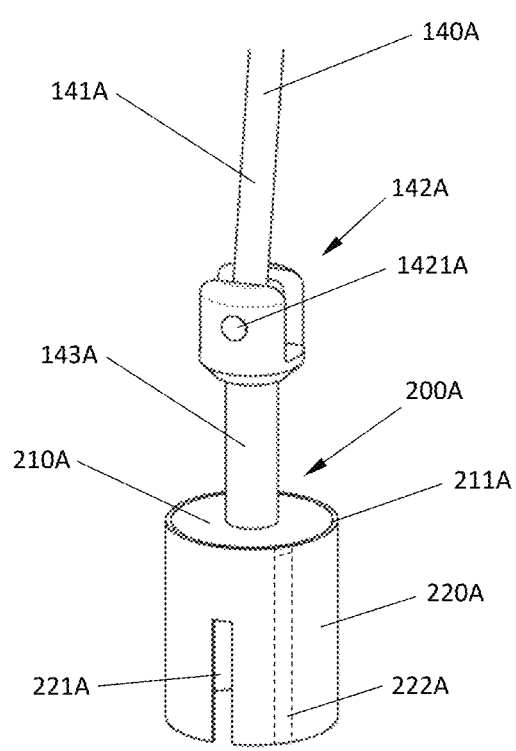
Fig. 5A
Fig. 5B

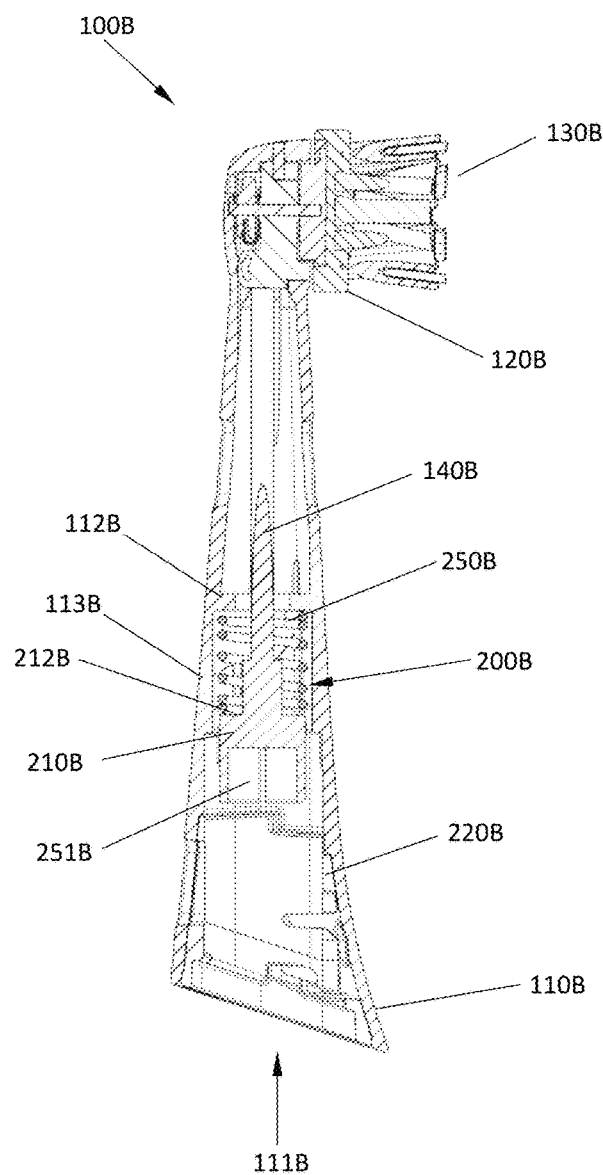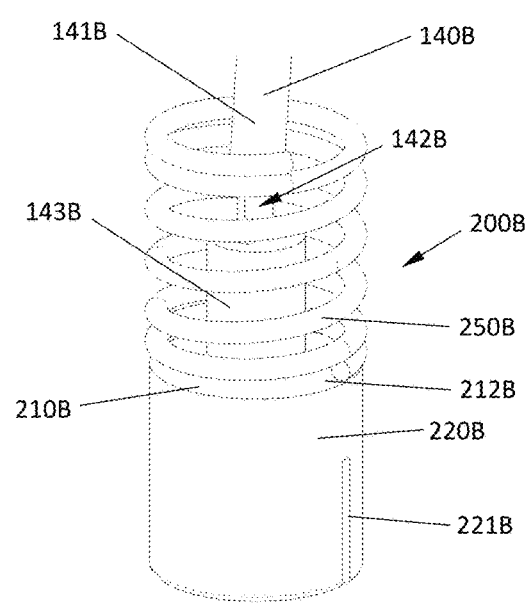
Fig. 6A                    Fig. 6B

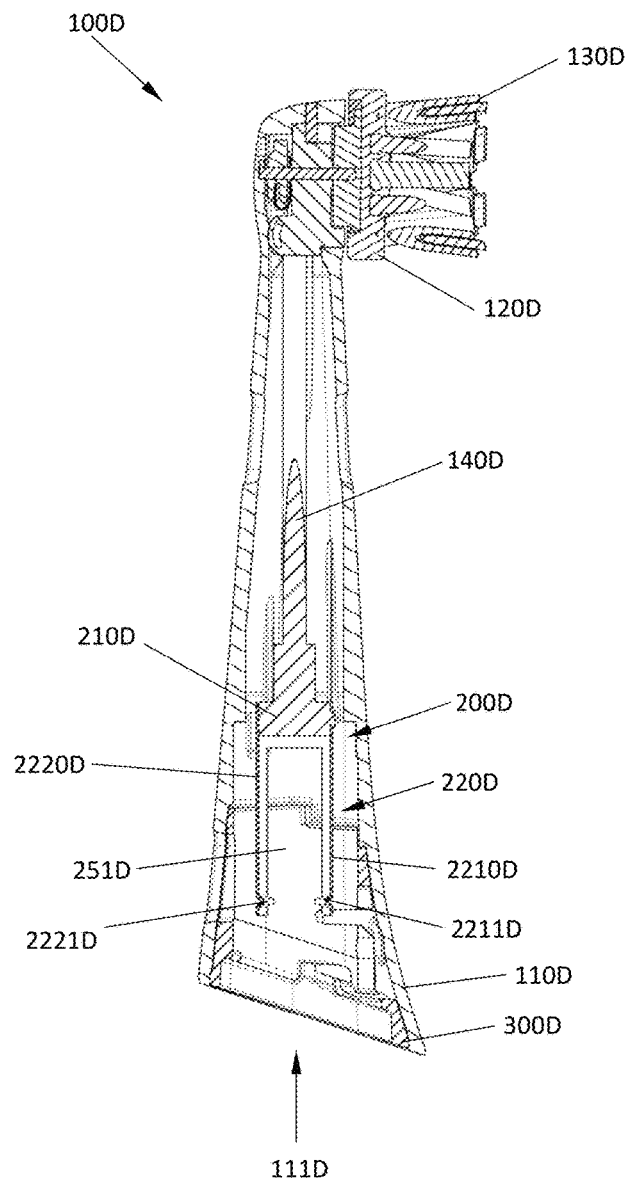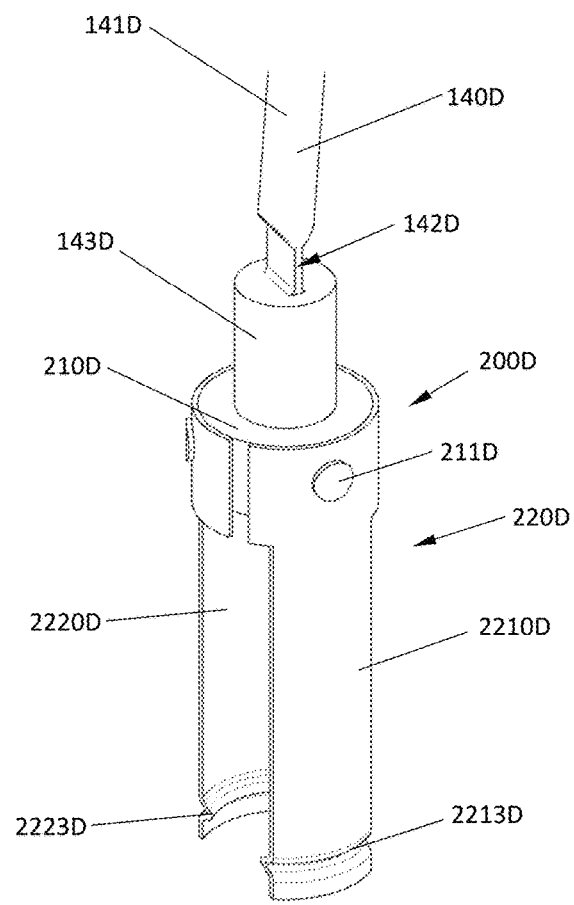
Fig. 8A
Fig. 8B

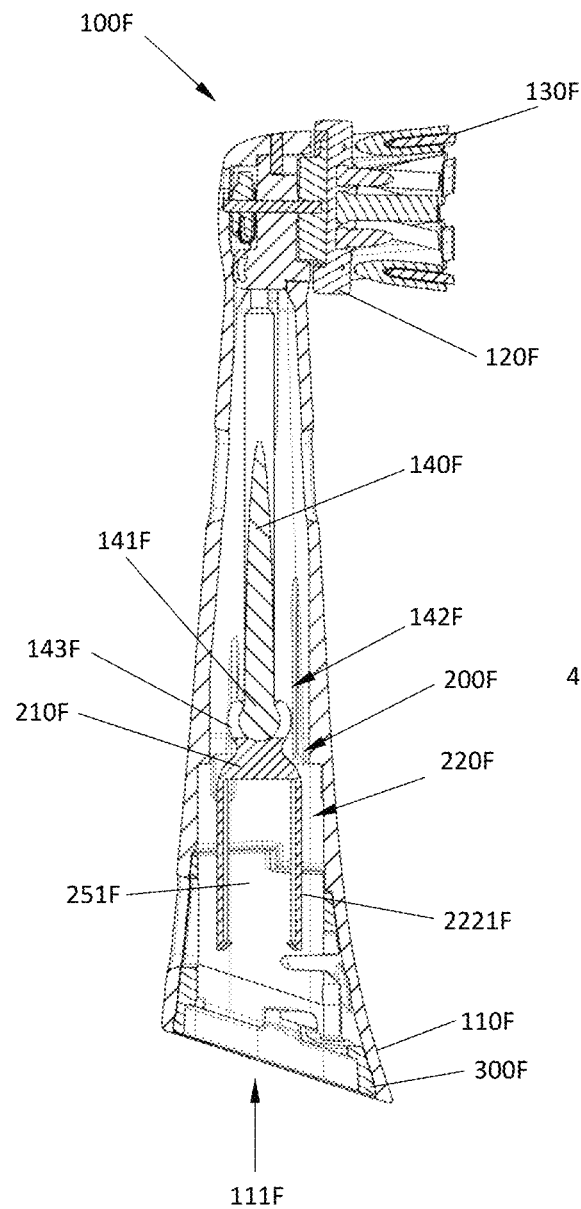
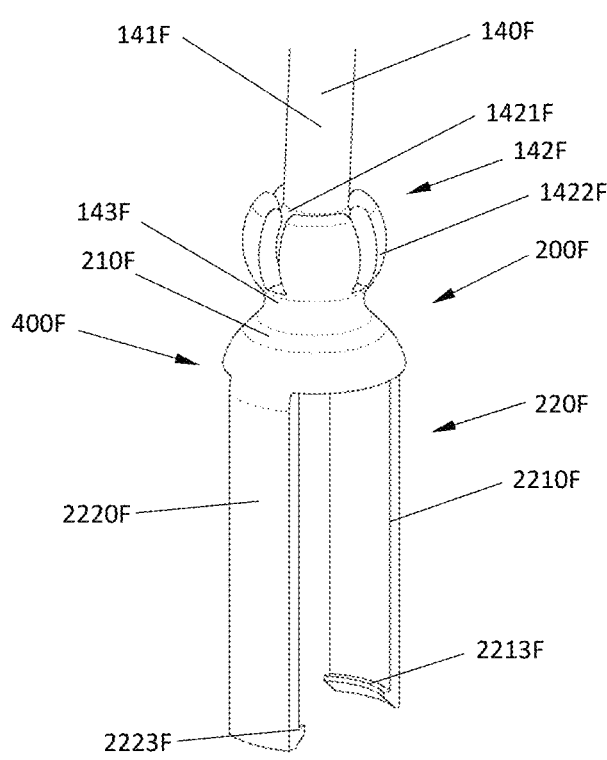
Fig. 10A
Fig. 10B

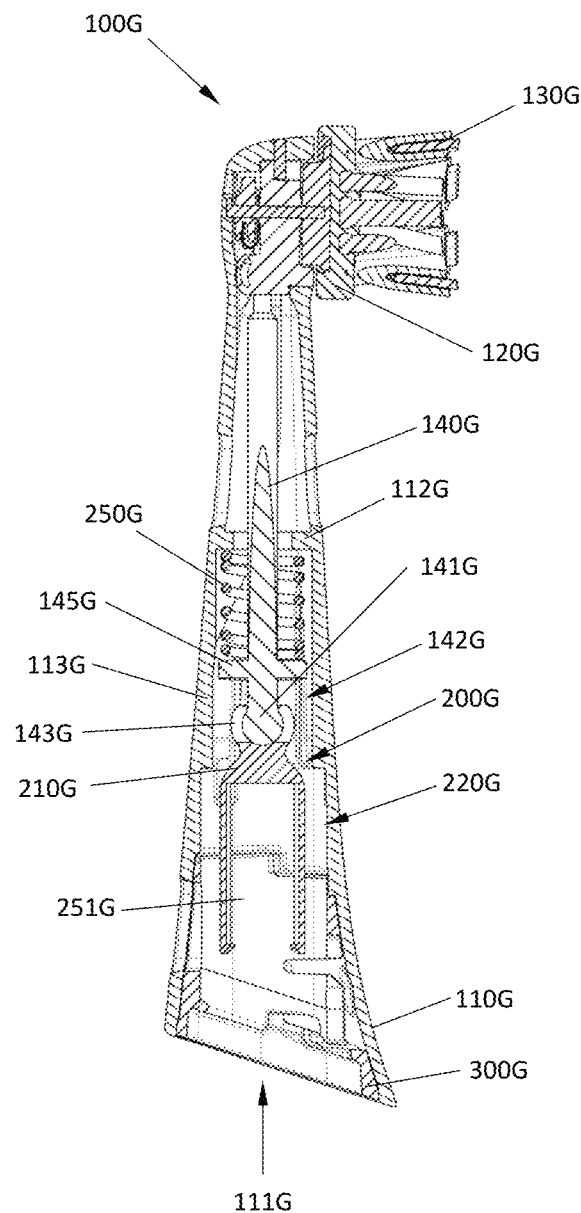 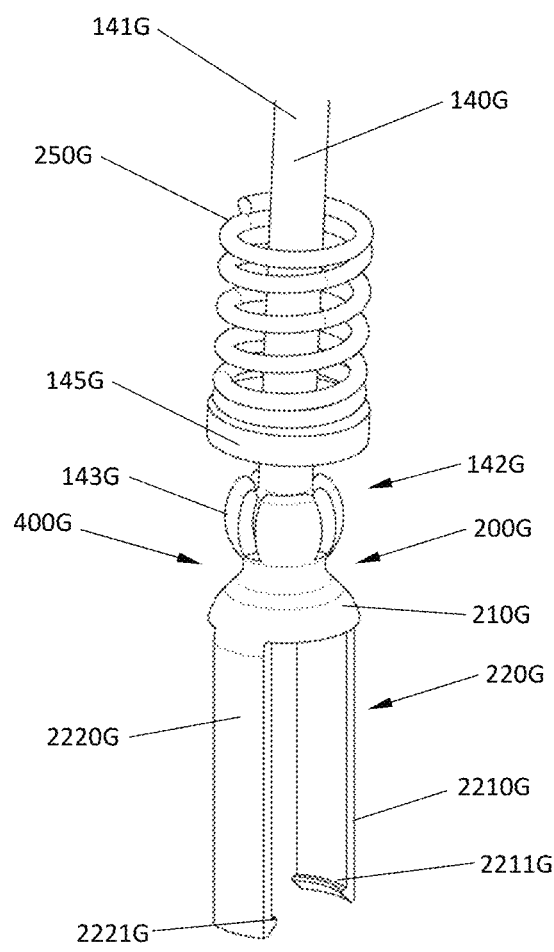
Fig. 11A
Fig. 11B

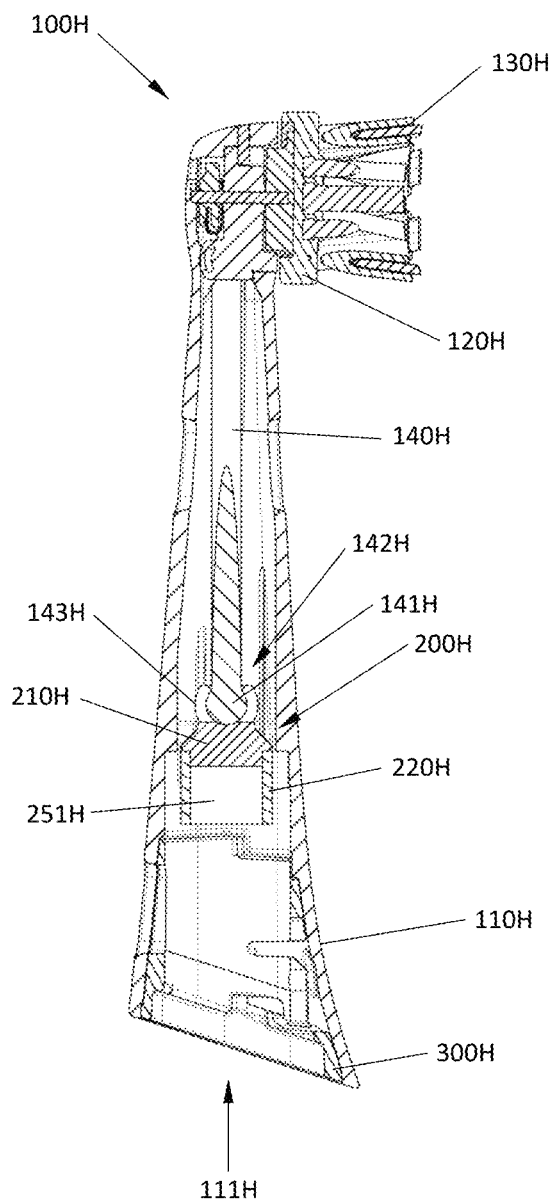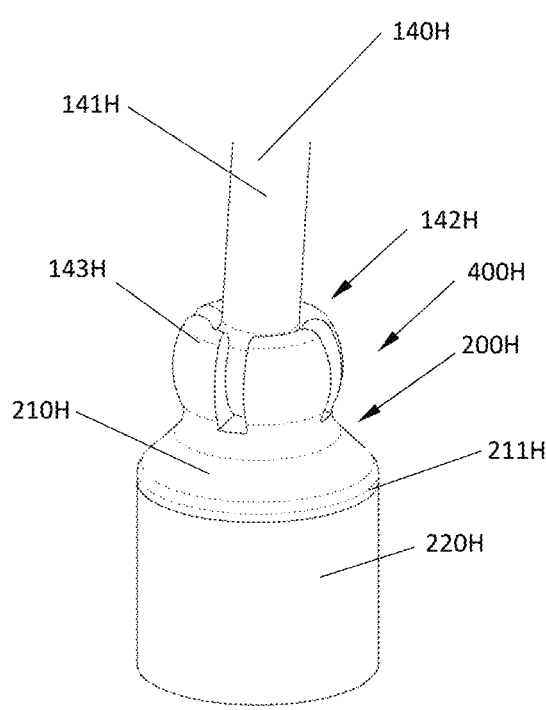
Fig. 12A
Fig. 12B

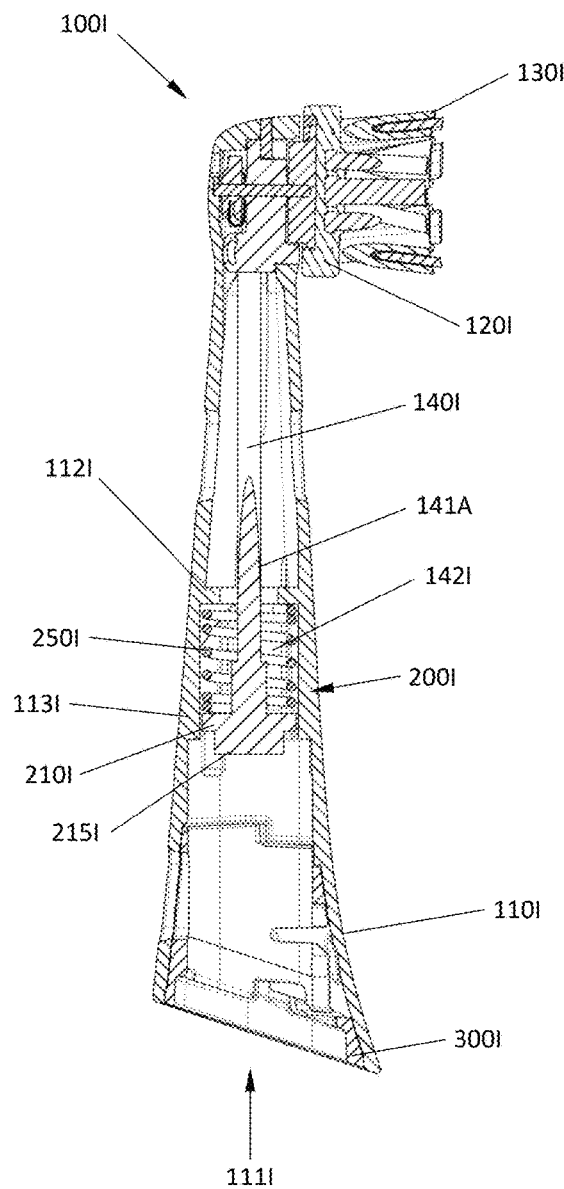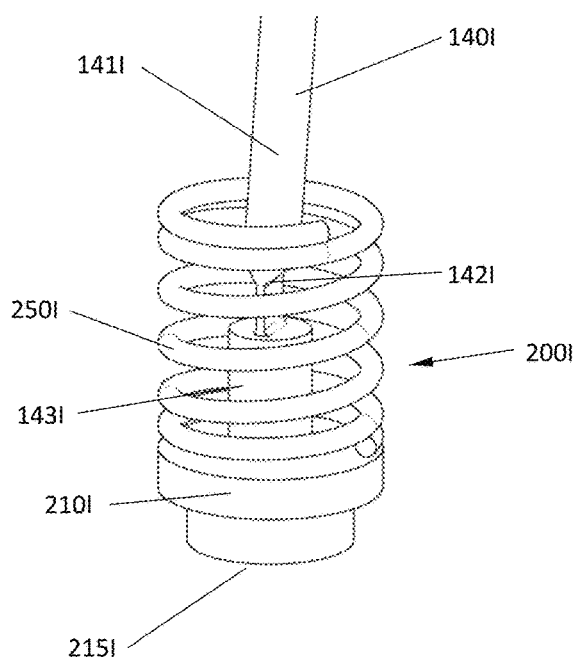
Fig. 13A                    Fig. 13B

ATTACHMENT FOR AN ORAL CARE DEVICE HANDLE

CROSS-REFERENCE TO RELATED APPLICATIONS

The present application is a continuation of U.S. patent application Ser. No. 18/103,553, filed Jan. 31, 2023, the entirety of which is hereby incorporated by reference.

FIELD OF THE INVENTION

The present disclosure is concerned with an oral care device attachment for being coupled to a drive shaft of an oral care device handle having an essentially cylindrical drive shaft coupling end.

BACKGROUND OF THE INVENTION

It is known that a drive shaft of an oral care device handle such as an electric toothbrush can be coupled to a motion transmitter disposed within an oral care device attachment such as a replacement brush head by means of magnetic attraction, specifically in case that the drive shaft provides a linear vibration. The motion transmitter may be coupled with a carrier mounted at an outer tube housing of the attachment so that the carrier is driven into an oscillating rotation around a rotation axis when the linear vibration of the drive shaft is transferred to the carrier by the motion transmitter.

Such a magnetic coupling avoids wear-prone mechanical coupling components and serves to transfer the linear vibration in a low noise manner as the magnetic attraction keeps the coupling partners together. As the magnetic coupling partners only need to connect to on the axial surfaces, the distance between, e.g., the drive shaft coupling end and a housing of the oral care device handle can be realized relatively small, e.g., with a circumferential distance or gap of less than 1 mm, which renders the overall coupling area less bulky than with other designs. Such a coupling concept is, for example, described in documents EP 2 550 938 B1.

But the magnetic coupling requires, e.g., a magnet disposed in the coupling end of the drive shaft of the oral care device handle and a further magnet or magnetizable element in the respective coupling end of the motion transmitter disposed in the attachment. These components make the coupling relatively expensive.

Hence, there is a need to provide a less expensive coupling between an essentially cylindrical coupling end of a drive shaft of an oral care device handle and a motion transmitter of an oral care device attachment for the oral care device handle that still allows for a small circumferential gap between the coupling end of the drive shaft and a housing of the oral care device handle.

SUMMARY OF THE INVENTION

In accordance with at least one aspect an oral care device attachment is provided that is arranged for being coupled to an oral care device handle having an essentially cylindrical drive shaft coupling end, the attachment having an outer attachment tube having a coupling end that is intended for being detachably secured at a housing of the oral care device handle, a carrier being mounted for driven motion at the outer attachment tube, a motion transmitter being disposed inside of the outer attachment tube, the motion transmitter having a first end coupled with the carrier and a second end being arranged for coupling with the essentially cylindrical drive shaft coupling end, the second end having a coupling unit having a top plate and at least one at least partly deformable essentially cylindrical wall element extending from the top plate or at least two elastic or deflectable wall elements extending from the top plate, respectively, where each of the elastic or deflectable wall elements extends over a portion of a virtual receiver cylinder so that an essentially cylindrical receiver receptacle is defined by the top plate and the one at least partly deformable essentially cylindrical wall element or by the top plate and the at least two elastic or deflectable wall elements.

In accordance with at least one aspect an oral care device attachment is provided that is arranged for being coupled to a drive shaft of an oral care device handle having an essentially cylindrical drive shaft coupling end, the attachment comprising an outer attachment tube having a coupling end that is intended for being secured at the oral care device handle, a carrier mounted for driven motion at the outer attachment tube, a motion transmitter disposed inside of the outer attachment tube, the motion transmitter has a first end coupled with the carrier and a second end arranged for being coupled with the essentially cylindrical drive shaft coupling end, the second end comprising a coupling unit having a top plate, wherein a spring is arranged between the outer attachment tube and the motion transmitter so that the motion transmitter is biased into a position towards the coupling end of the outer attachment tube.

BRIEF DESCRIPTION OF THE DRAWINGS

The present disclosure will be further elucidated by a detailed description of example embodiments and with reference to figures.

FIG. 4A is a cross-sectional depiction of a first example of an oral care device attachment as proposed in the present disclosure;

FIG. 4B is a depiction of a portion of a motion transmitter and of a coupling unit provided at a second end of the motion transmitter in accordance with the first example;

FIG. 5A is a cross-sectional depiction of a Second example of an oral care device attachment as proposed in the present disclosure;

FIG. 5B is a depiction of a portion of a motion transmitter and of a coupling unit provided at a second end of the motion transmitter in accordance with the second example;

FIG. 6A is a cross-sectional depiction of a third example of an oral care device attachment as proposed in the present disclosure;

FIG. 6B is a depiction of a portion of a motion transmitter and of a coupling unit provided at a second end of the motion transmitter in accordance with the third example;

FIG. 8A is a cross-sectional depiction of a fifth example of an oral care device attachment as proposed in the present disclosure;

FIG. 8B is a depiction of a portion of a motion transmitter and of a coupling unit provided at a second end of the motion transmitter in accordance with the fifth example;

FIG. 10A is a cross-sectional depiction of a seventh example of an oral care device attachment as proposed in the present disclosure;

FIG. 10B is a depiction of a portion of a motion transmitter and of a coupling unit provided at a second end of the motion transmitter in accordance with the seventh example;

FIG. 11A is a cross-sectional depiction of an eighth example of an oral care device attachment as proposed in the present disclosure;

FIG. 11B is a depiction of a portion of a motion transmitter and of a coupling unit provided at a second end of the motion transmitter in accordance with the eighth example;

FIG. 12A is a cross-sectional depiction of a ninth example of an oral care device attachment as proposed in the present disclosure;

FIG. 12B is a depiction of a portion of a motion transmitter and of a coupling unit provided at a second end of the motion transmitter in accordance with the ninth example;

FIG. 13A is a cross-sectional depiction of a tenth example of an oral care device attachment as proposed in the present disclosure;

FIG. 13B is a depiction of a portion of a motion transmitter and of a coupling unit provided at a second end of the motion transmitter in accordance with the tenth example.

DETAILED DESCRIPTION OF THE INVENTION

In accordance with the present disclosure, solutions are proposed for coupling an oral care device attachment to an oral care device handle having a drive shaft with an essentially cylindrical drive shaft coupling end. The drive shaft is arranged to provide a linear vibration, i.e., an oscillatory motion of the drive shaft along is longitudinal axis. The essentially cylindrical drive shaft coupling end may have (a) a diameter in a range of between 4 mm and 8 mm, preferably of about 6 mm such as 6.2 mm, (b) a relatively small circumferential distance to a portion of a housing of the handle enveloping the essentially cylindrical drive shaft coupling end, where the circumferential gap or distance may be less than about 1 mm, preferably less than about 0.8 mm, further preferably in the range of about 0.6 mm and/or (b) may have at least one indentation, a circumferential groove or may continue with a lower diameter.

The circumferential may be non-constant, i.e., the housing enveloping the essentially cylindrical drive shaft coupling end may have a non-circular cross-section or may be arranged non-coaxial with respect to the essentially cylindrical drive shaft coupling end. That may mean that the circumferential gap has, e.g., a gap width of about 0.6 mm in at least one area and a gap width of, e.g., 1.0 mm in another area. The gap width shall be understood to be measured in a plane that is perpendicular to a longitudinal axis of the essentially cylindrical drive shaft coupling end. Further, the essentially cylindrical drive shaft coupling end may have a length extension in the direction of the longitudinal axis in the range of between 4 mm to 20 mm, preferably in the range of 8 mm to 16 mm, further preferably of about 14 mm such as 13.8 mm.

Figure 1:
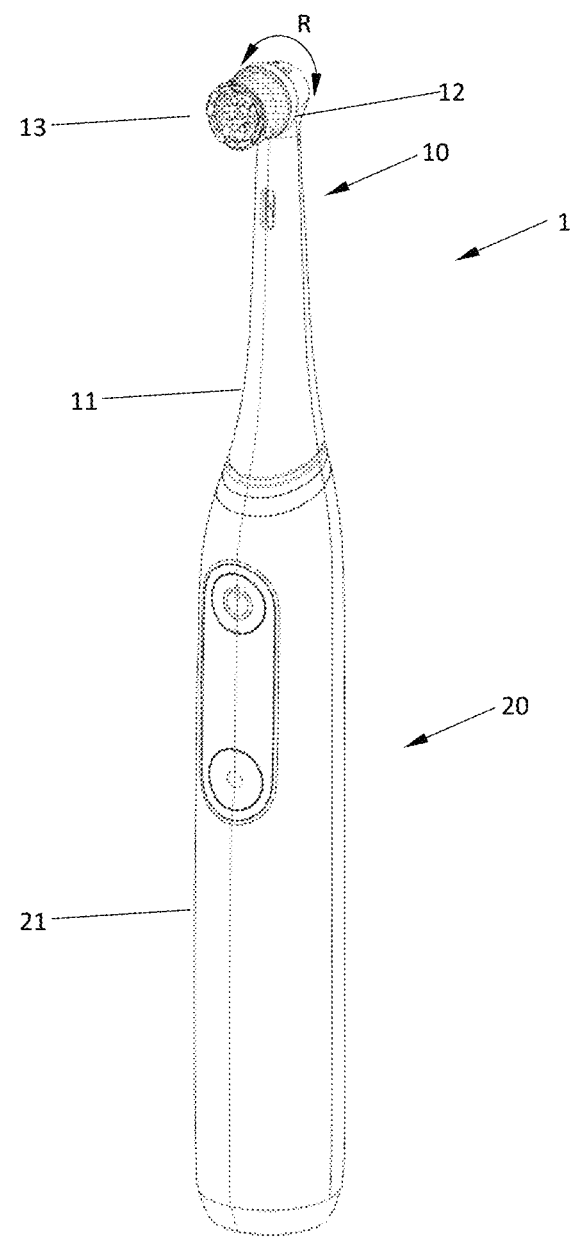
FIG. 1 is a depiction of an oral care device realized as an electric toothbrush.

FIG. 1 is a depiction of an example oral care device 1 that comprises an oral care device attachment 10 (referred to herein also simply as "attachment") and an oral care device handle 20 (referred to herein also simply as "handle"). The attachment 10 comprises an outer attachment tube or housing 11, a carrier 12 that is mounted at the outer attachment tube 11 for driven oscillatory rotation as is indicated by double arrow R (even though the herein proposed attachment is not limited to comprise carriers being driven into an oscillatory rotation).

Oral Care elements 13 are here mounted on the carrier 12. The handle comprises a housing 21. The attachment 10 is detachably attached to the handle 20, preferably, the outer attachment tube 11 is mechanically secured at the housing 21 of the handle 20 so that in an attached state the outer attachment tube 11 and the housing 21 do not move relative to each other.

As will be explained in more detail, a drive shaft of the handle 20 is detachably connected with a motion transmitter disposed in the outer attachment tube 11 so that a motion (typically a linear vibration along a longitudinal direction) provided by the drive shaft is transmitted to the carrier 12 in operation by the motion transmitter. The oral care device 1 is here shown as an electric toothbrush, the attachment 10 as a replaceable brush head and the oral care elements 13 as bristle tufts.

Figure 2:
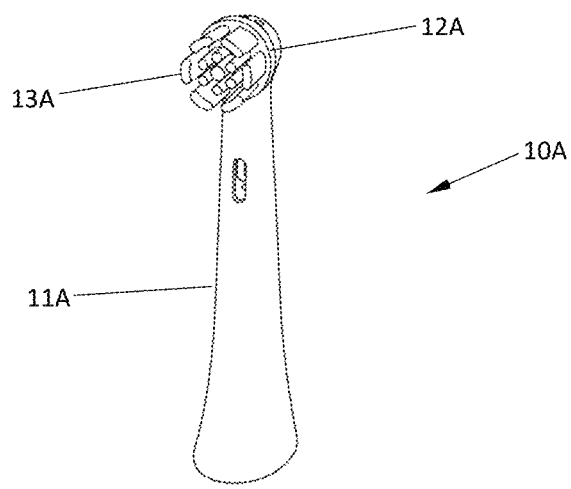
FIG. 2 is a depiction of a replaceable oral care attachment for an oral care device the attachment here being realized as a toothbrush head.

FIG. 2 is a depiction of an example attachment 10A shown in isolation. The attachment 10A comprises an outer attachment tube or housing 11A, a carrier 12A mounted at the outer attachment tube 11A for driven motion and a plurality of oral care elements 13A mounted on the carrier 12A.

Figure 3:
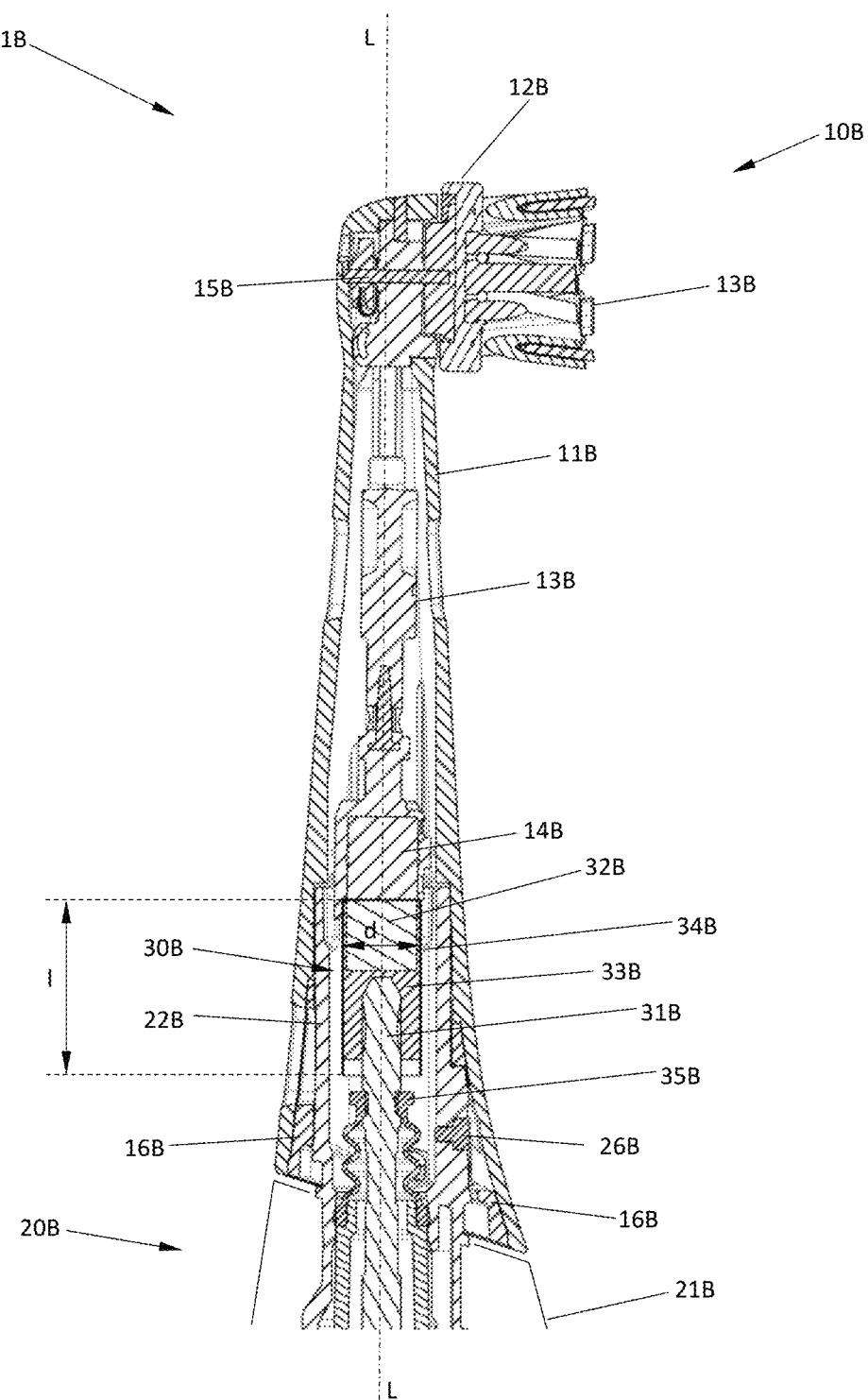
FIG. 3 is cross-sectional cut through a coupling section between an oral care handle and a replaceable oral care attachment as known from prior art.

FIG. 3 is a cross-sectional cut through a top portion of an oral care device 1B comprising an attachment 10B detachably attached to a handle 20B (only partly shown) that has a housing 21B that is here only indicated. The attachment 10B and the handle 20B generally extend along a longitudinal axis L that here coincides with a central axis of a drive shaft 31B of the handle 20B.

The cross-sectional cut shows an oral care device 1B as it is generally discussed, e.g., in document EP 2 550 940 B1. In the oral care device 1B, a motion transmitter 13B is coupled at a first end with a carrier 12B, which carrier 12B carries a plurality of oral care elements 13B and is mounted at an outer attachment tube 11B of the attachment 10B for driven rotation about an axle 15B, i.e., about a rotation axis defined by the axle 15B. The motion transmitter 13B comprises at a second end a first magnetically interacting element 14B and is releasably coupled with an essentially cylindrical drive shaft coupling end 30B.

The essentially cylindrical drive shaft coupling end 30B comprises a second magnetically interacting element 32B that magnetically interacts with the first magnetically interacting element 14B so that both magnetically interacting elements 14B and 32B essentially stay in abutting contact in regular operation when the drive shaft 31B provides a linear reciprocation motion along the longitudinal axis L. The magnetic interaction is established by each of the magnetically interacting elements 14B and 32B being realized as a magnet or by one of them being realized as a magnet and the other as a magnetizable element.

The first magnetically interacting element 14B is secured at the second end of the motion transmitter 13B and the second magnetically interacting element 32B is a part of the essentially cylindrical drive shaft coupling end 30B. One may prefer to realize the second magnetically interacting element 32B as a magnet and the first magnetically interacting element 14B as a magnetizable element as the attachment 10B may typically intended to be a disposable part.

The essentially cylindrical drive shaft coupling end 30B is here realized by a cap 34B, e.g., a metal cap, in which the second magnetically interacting element 32B, which may be a cylindrical magnet, e.g., a cylindrical NdFeB-type magnet, is one the one hand secured to the cap 34B by means of an adhesive 33B and on the second hand secured to the drive shaft 31B by means of the adhesive 33B. The essentially cylindrical drive shaft coupling end 30B has a diameter d and a length 1 as is indicated in FIG. 3. Potential values for the diameter d and the length 1 have been discussed in a previous paragraph.

Underneath the essentially cylindrical drive shaft coupling end 30B, i.e., at the lower end facing the handle 20B, an undercut may be provided as the drive shaft 31B may be smaller in diameter than the essentially cylindrical drive shaft coupling end 30B. The meaning of the term "undercut" in the present application is thus of a portion underneath the essentially cylindrical drive shaft coupling end that is smaller in diameter than the essentially cylindrical drive shaft coupling end itself and it may be smaller in all directions or just in one or several circumferentially distributed areas.

The attachment 10B here comprises a coupling end comprising a first mechanical connector 16B that is detachably coupled with a second mechanical connector 26B of the handle 20B so that the outer attachment tube 11B and a drive shaft housing 22B are positionally secured to each other. The first and second mechanical connectors 16B and 26B may mechanically couple to each other by means of mechanical coupling elements such as flexible snap hooks as is generally known in the art. The drive shaft 31B may be sealed against a hollow of the drive shaft housing 22B by means of a seal 35B so that liquids cannot enter the hollow.

In the following, ten example embodiments of oral care device attachments in accordance with the present disclosure are described. All example attachments but the tenth example attachment comprise a coupling unit having a top plate and either (a) one at least partly deformable essentially cylindrical wall element that together with the top plate defines a receiver cylinder suitable to receive an essentially cylindrical drive shaft coupling end of a drive shaft from an oral care device handle or (b) at least two elastic or deflectable or pivotable wall elements that define an essentially cylindrical receiver volume or receptacle to receive said essentially cylindrical drive shaft coupling end. There are at least three additional aspects that are considered in the example embodiments, which aspects can be implemented individually or together, i.e., two of the three aspects together or all three aspects together.

These three additional aspects are:
(1) A spring arranged between the outer attachment tube and the motion transmitter so that the second end of the motion transmitter comprising the coupling unit is biased towards the coupling end of the attachment or, in other words, is biased against the essentially cylindrical drive shaft coupling end in an attached state and during the attachment process.
(2) A separable mechanical coupling between the coupling unit and the remainder of the motion transmitter so that the coupling unit can be considered as an adapter that can be attached onto the essentially cylindrical drive shaft coupling end and that can remain there when the remainder of the attachment is detached.
(3) At least one protrusion provided at the deformable essentially cylindrical wall element or at least at one of the at least two elastic or deflectable or pivotable wall elements that is suitable to interact with a receptacle or an undercut of the essentially cylindrical drive shaft coupling end.

Possible material choices for realizing the at least one at least partly deformable essentially cylindrical wall element from a thermoplastic elastomer or a natural rubber comprise, in a non-limiting manner, one of following materials: thermoplastic elastomer (TPE), nitrile rubber (NBRs), silicone rubber, EPDM rubber, styrene-butadiene rubber (SBR).

Possible material choices for realizing the at least partly deformable essentially cylindrical wall element or the at least two elastic or deflectable wall elements from a thermoplastic material comprise, in a non-limiting manner, one of following materials: polypropylene (PP), polyamide (PA), polyoxymethylene (POM), acrylonitrile butadiene styrene (ABS), thermoplastic elastomer (TPE) such as Hytrel, or polybutylene terephthalate (PBT). The same materials can be chosen for realizing the top plate if the top plate or a part thereof are to be made from a thermoplastic material.

Possible material choices for realizing the at least partly deformable essentially cylindrical wall element or the at least two elastic or deflectable wall elements from sheet metal comprise, in a non-limiting manner, one of following materials: stainless steel, e.g., having the material number 1.4301, 1.4303, 1.4305, 1.4306, 1.4307, 1.4310 according to standard EN 10027-2 and other non-corroding steels or other metals suitable for making thin foils with good elastic properties that preferably are labelled as food-grade materials. Other metal materials like molybdenum, titanium or alloys may be used as well but tend to be more expensive. The same materials can be chosen for realizing the top plate if the top plate or a part thereof are to be made from metal.

Figure 4C:
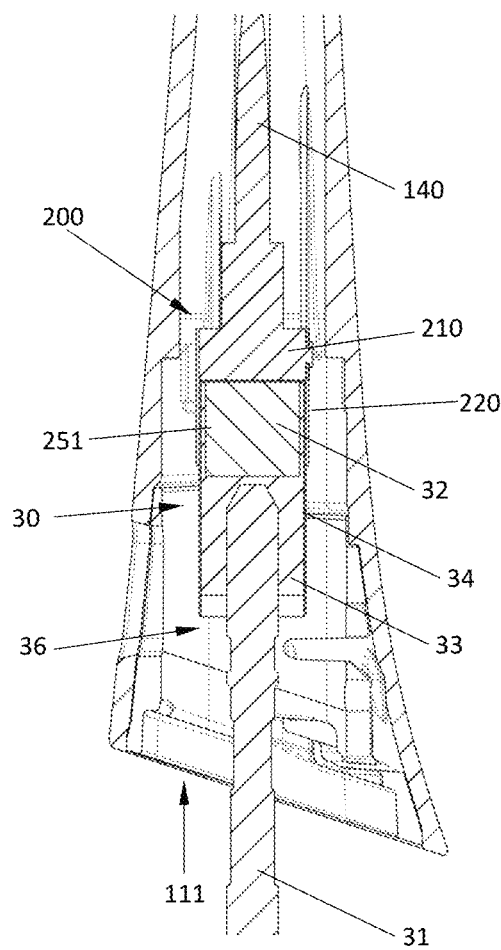
FIG. 4C is a cross-sectional cut through the attachment shown in FIG. 4A in a state in which the motion transmitter is coupled a drive shaft of an oral care device handle.
Figure 4D:
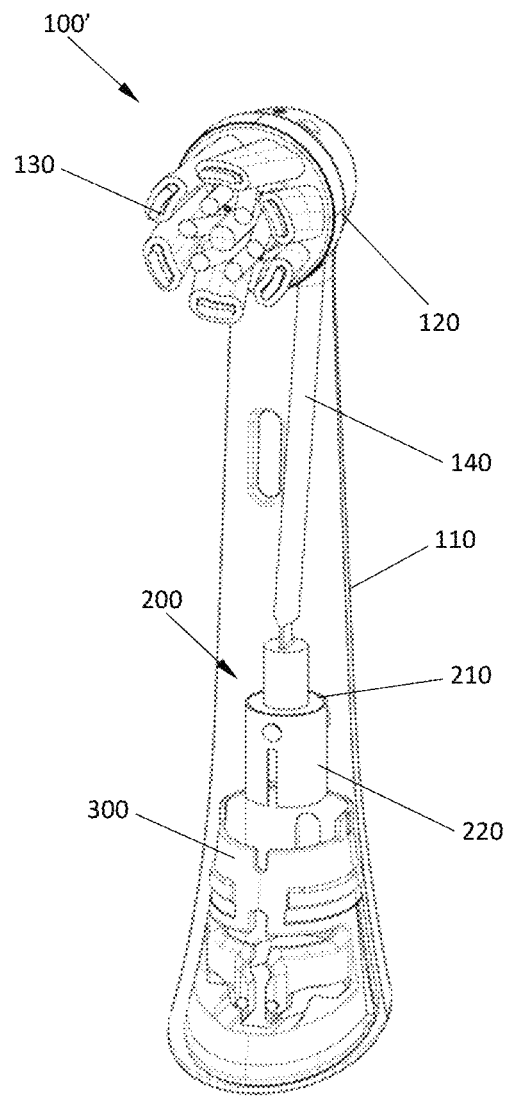
FIG. 4D is a perspective depiction of parts of the attachment shown in FIG. 4A—where a mechanical connector omitted in FIG. 4A is shown as well—with the outer attachment tube only being indicated.

FIGS. 4A to 4D are depictions of a first example of an attachment 100 as proposed herein. FIG. 4A is a cross-sectional cut through the attachment 100, FIG. 4B is a perspective view onto a detail showing the second end of a motion transmitter 140 comprising a coupling unit 200, FIG. 4C is a cross-sectional cut through a lower portion of the attachment 100 and of a drive shaft 22 comprising an essentially cylindrical drive shaft coupling end 30, and FIG. 4D is a perspective and partly transparent view onto an attachment 100' that further comprises a first mechanical connector 300 that is omitted in FIG. 4A. Identical features of the attachment 100 or 100' have the same reference numerals.

The attachment 100 shown in FIG. 4A has an outer attachment tube 110 and a motion transmitter 140 arranged within a hollow of the outer attachment tube 110. The motion transmitter 140 has a first end that is coupled with a carrier 120 that carries oral cleaning elements 130 and that is arranged for driven motion relative to the outer attachment tube 110. The attachment 100 has a lower end comprising an opening 111 for allowing coupling of the attachment 100 to a handle of an oral care device, where specifically a drive shaft of the handle would enter into the hollow via the opening 111 to establish a connection with a second end or coupling end of the motion transmitter 140, the coupling end of the motion transmitter 140 comprising a coupling unit 200. The coupling unit 200 comprises a top plate 210 and an at least partly deformable essentially cylindrical wall element 220 that defines a virtual receiver cylinder 251 for receiving an essentially cylindrical drive shaft coupling end of a drive shaft of a handle of an oral care device—see FIG. 4C. The lower end of the attachment 100 typically comprises a first mechanical connector 300, which is omitted in FIGS. 4A and 4C, but is shown in FIG. 4D.

FIG. 4B shows the lower portion of the motion transmitter 140, where "lower" relates to the second end of the motion transmitter 140 that comprises the coupling unit 200. The motion transmitter 140 has a first portion 141 that extends towards the first end that is coupled with the carrier 120 (see FIG. 4A) and a second portion 143 that continues into the coupling unit 200. A pivot 142 is provided between the first portion 141 and the second portion 143 of the motion transmitter 140 to compensate for an angulation between the first and second portions 141, 143 of the motion transmitter 140 in operation. The pivot 142 is here realized as a living hinge.

The coupling unit 200 comprises the top plate 210 that here is integral with the motion transmitter 140 and the complete integral part may be made by plastic injection molding. The at least partly deformable cylindrical wall element 220 comprises a slot 221 that extends from a lower end to the level of the top plate 210 to make the wall element 220 at least partly deformable due to its elastic properties. The at least partly deformable cylindrical wall element 220 may be made from thin bent metal sheet, e.g., the metal sheet may have a thickness of between 50 micrometer and 500 micrometer, preferably between 75 micrometer and 250 micrometer such as 75 micrometer, 100 micrometer, 125 micrometer, 150 micrometer, 175 micrometer, 200 micrometer, 225 micrometer or 250 micrometer. These thickness values are generally applicable to all embodiments comprising a metal sheet part.

The at least partly deformable cylindrical wall element 220 may be connected to the top plate 210 by at least one, preferably at least two caulked projections 211 extending from the top plate 210. This shall not exclude that the wall element 220 may be secured to the top plate 210 by other or additional techniques such as (laser) welding, gluing, riveting, screwing etc. Alternatively or additionally to the slot 221, the wall element 220 may comprise a slot 222 that is indicated by dashed lines and that may extend along the complete length of the wall element 220. The coupling unit 200 comprises a receiver opening 250 to allow the essentially cylindrical drive shaft coupling end to enter into the virtual receiver cylinder 251 (see FIG. 4A).

FIG. 4C shows the same cross-sectional cut as shown in FIG. 4A but only of a portion of the attachment 100 and including an upper portion of a drive shaft 31 having an essentially cylindrical drive shaft coupling end 30 that is shown here in a coupled state in which the essentially cylindrical drive shaft coupling end 30 is received in the virtual receiver cylinder 251. As was already discussed in connection with FIG. 3, the essentially cylindrical drive shaft coupling end 30 may comprises a magnet or magnetizable element 32, a cap 34 and an adhesive 33 fixedly connection the cap 34, the magnet or magnetizable element 32 and the drive shaft 31 together. But it is noted here, that the magnetically interaction capability is not of relevance as the attachments discussed herein attach mechanically to the essentially cylindrical drive shaft coupling end 30. Thus, the essentially cylindrical drive shaft coupling end 30 may also be just a cylinder, e.g., a plastic cylinder or a metal cylinder.

Underneath the essentially cylindrical drive shaft coupling end 30 a smaller diameter section 36 may extend so that an undercut in accordance with the definition of "undercut" provided in a previous paragraph is provided there. The embodiments shown in FIGS. 7A to 11B make use of the presence of such an undercut underneath the essentially cylindrical drive shaft coupling end 30. It is noted that instead of a smaller diameter section realizing the undercut also a groove or individual receptacles may be provided in the essentially cylindrical drive shaft coupling end 30 to realize the undercut.

FIG. 4D is a perspective view of an attachment 100' essentially identical with the attachment 100 shown in FIGS. 4A and 4C but with the outer attachment tube 110 shown transparent and with a first mechanical connector 300 disposed in the lower end of the attachment 100', where the term lower end refers to the end of the attachment 100' that is intended to be coupled with a handle. The other elements shown in FIG. 4D have already been discussed and it is referred to the above description relating to FIGS. 4A to 4C.

FIGS. 5A and 5B are depictions of a second example of an attachment 100A as proposed herein. The elements of this embodiment that remain essentially identical in comparison to FIGS. 4A and 4B are not again discussed (the reference numerals change, e.g., from 120 to 120A or to 120B etc. in the following embodiments) and only the differences are highlighted. This will also hold true for the following description up to and including FIGS. 13A and 13B. Instead of a living hinge as discussed for the first example embodiment, the second example embodiment comprises a pivot 142A realized by a swivel joint having a pivot axle 1421A.

The pivot 142A allows a first portion 141A and a second portion 143A of a motion transmitter 140A to pivot relatively to each other to allow a changing angulation between the first portion 141A and the second portion 143A. The coupling unit 200A comprises a top plate 210A and an at least partly deformable essentially cylindrical wall element 220A that defines a virtual receiver cylinder 251A for receiving an essentially cylindrical drive shaft coupling end of a drive shaft. The top plate 210A and the second portion 143A of the motion transmitter 140A may be made from metal such as non-magnetic steel and the partly deformable essentially cylindrical wall element 220A may again be made from non-magnetic thin metal sheet material and may be connected to the top plate 210A by laser welding or any other metal connection technology such as gluing, screwing, riveting etc.

FIGS. 6A and 6B are depictions of a third example of an attachment 100B as proposed herein. Here, a spring 250B is arranged between a coupling unit 200B and an outer attachment tube 110B so that the coupling unit 200B is biased towards an opening 111B provided in a lower end of the attachment 110B. The spring 250B is here at one end abutting an annular abutment surface 112B provide on the inner surface of the outer attachment tube 110B and on the other end is abutting a top abutment surface 212B of a top plate 210B of the coupling unit 200B. The spring 250B supports attaching the coupling unit 200B on an essentially cylindrical drive shaft coupling end of a drive shaft in an attachment process.

The outer attachment tube 110B may comprise an essentially cylindric inner section 113B that provides a guide for the spring 250B so that the spring cannot bulge or move sidewards. The coupling unit 200B here comprises the top plate 210B and an at least partly deformable essentially cylindrical wall element 220B that may be made from plastic and that may be realized together with a motion transmitter 140B as an integral part. As was discussed with respect to the previous embodiments, the at least partly deformable essentially cylindrical wall element 220B may comprise a slot or other cutout 221B that supports the deformation of the at least partly deformable essentially cylindrical wall element 220B.

Figures 7A, 7B:
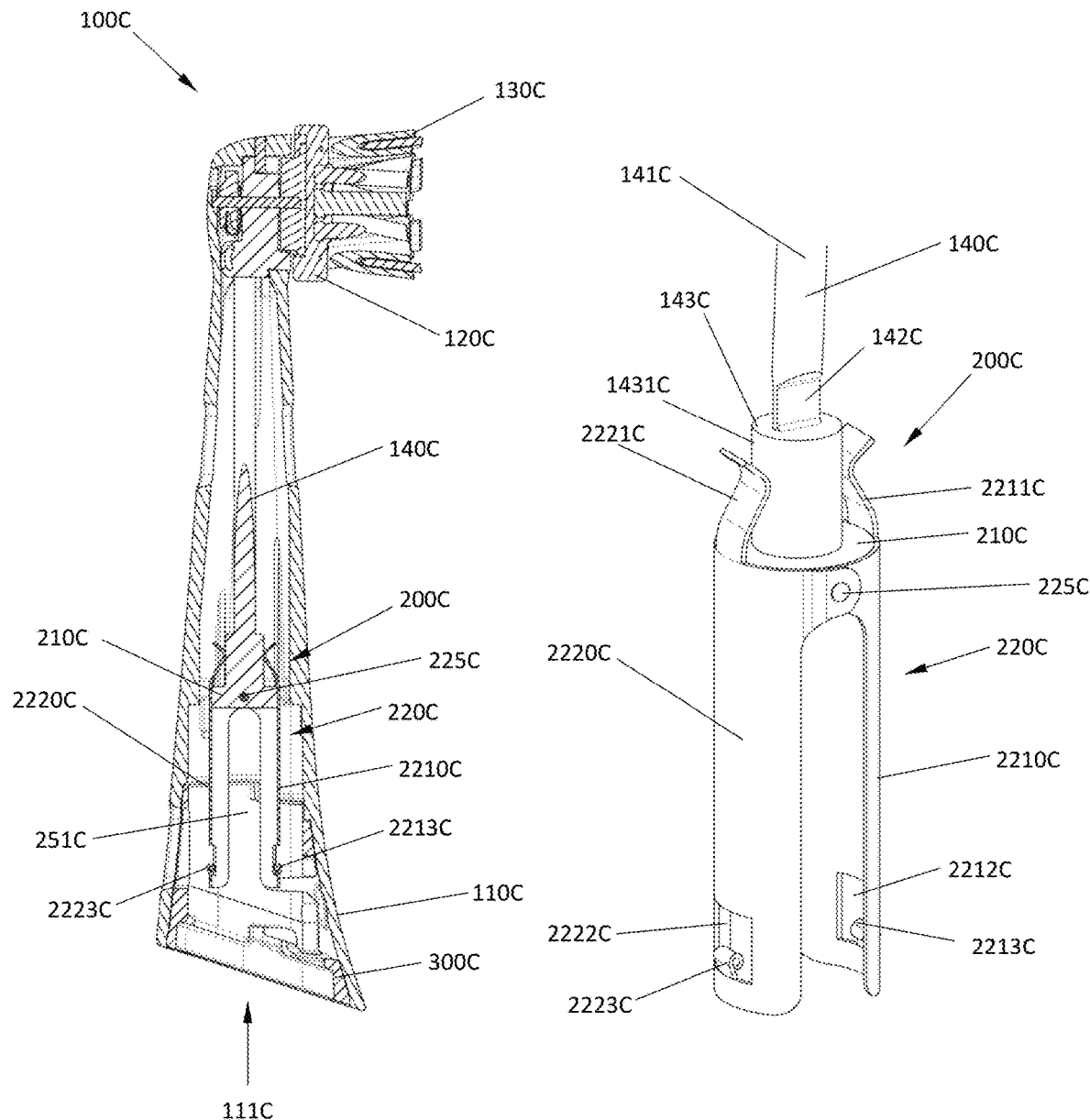
FIG. 7A is a cross-sectional depiction of a fourth example of an oral care device attachment as proposed in the present disclosure.
FIG. 7B is a depiction of a portion of a motion transmitter and of a coupling unit provided at a second end of the motion transmitter in accordance with the fourth example.

FIGS. 7A and 7B are depictions of a fourth example of an attachment 100C as proposed herein. The attachment 100C comprises a coupling unit 200C that has some similarities with a secondary closure for champagne bottles. The coupling unit 200C has two deflectable or pivotable wall elements 2210C and 2220C mounted at a top plate 210C of the coupling unit 200C. The two deflectable wall elements 2210C and 2220C are each deflectable or pivotable around an axle 225C, i.e., around an axis defined by the axle 225C, against a restoring spring force. In their rest position, the two deflectable wall elements 2210C and 2220C envelope a virtual receiver cylinder 251C for receiving an essentially cylindrical drive shaft coupling end of a drive shaft.

Each of the two deflectable wall elements 2210C and 2220C comprises a spring extension 2211C and 2221C, respectively, that each abut an abutment surface 1431C of a second portion 143C of a motion transmitter 140C, even though this is considered non-limiting and the restoring spring force may be otherwise provided. In case that one of the two deflectable wall elements 2210C or 2220C is deflected essentially radially outwards around the axle 225C, the respective spring extension 2211C or 2221C is pushed against the second portion 143C of the motion transmitter 140C and thus elastically deforms, whereby a restoring spring force is created that pushes the deflected wall element back 2210C or 2220C into its rest position. In the shown embodiment, each of the two deflectable wall elements 2210C and 2220C comprises a cut-out 2212C and 2222C, respectively, provided at a lower end and each comprises a radially inwards extending projection 2213C and 2223C, respectively.

The projections 2213C and 2223C may be realized as being integral with the respective deflectable wall element 2210C and 2220C at which they are provided. E.g., the wall elements 2210C and 2220C may be made from thin metal sheet material and the projections 2213C and 2223C may be made from a rolled or folded or bent piece of metal sheet material as is indicated in FIG. 7B. When an essentially cylindrical drive shaft coupling end enters into the virtual receiver cylinder 251C, the projections 2213C and 2223C push the two deflectable wall elements 2210C and 2220C radially outwards so that they pivot around the axle 225C until the projections 2213C and 2223C snap into an undercut such as a smaller diameter section underneath the essentially cylindrical drive shaft coupling end or a groove or receptacle provided in the essentially cylindrical drive shaft coupling end.

FIGS. 8A and 8B are depictions of a fifth example of an attachment 100D as proposed herein. The attachment 100D comprises a coupling unit 200D that comprises two deflectable wall elements 2210D and 2220D that define a virtual receiver cylinder 251D. In contrast to the fourth embodiment, the two deflectable wall elements are not arranged to be pivotable around an axle but are arranged to be deflectable or bendable due to the elasticity of the material from which they are made, e.g., they may be made from a metal sheet material. A top plate 210D of the coupling unit 200D and a motion transmitter 140D are an integral part that may be made by plastic injection molding.

The two deflectable wall elements 2210D and 2220D may be connected to the top plate 210D by means of one or several caulked projections 211D or other techniques as was already discussed with reference to FIG. 4B. Further, the two deflectable wall elements 2210D and 2220D each comprise a radially inwards extending projection 2213D and 2223D, respectively. The projections 2213D and 2223D may be made by stamping or bending. It is noted here for sake of clarity that while in this embodiment the projections 2213D and 2223D are realized in a manner different to the projection discussed with respect to the fourth example embodiment, this is not to be understood as limiting. All ways to realize the projections may be interchangeably used in all embodiments where projections are used and specifically the two or more projections do not all need to be made in the same manner.

Figure 9A:
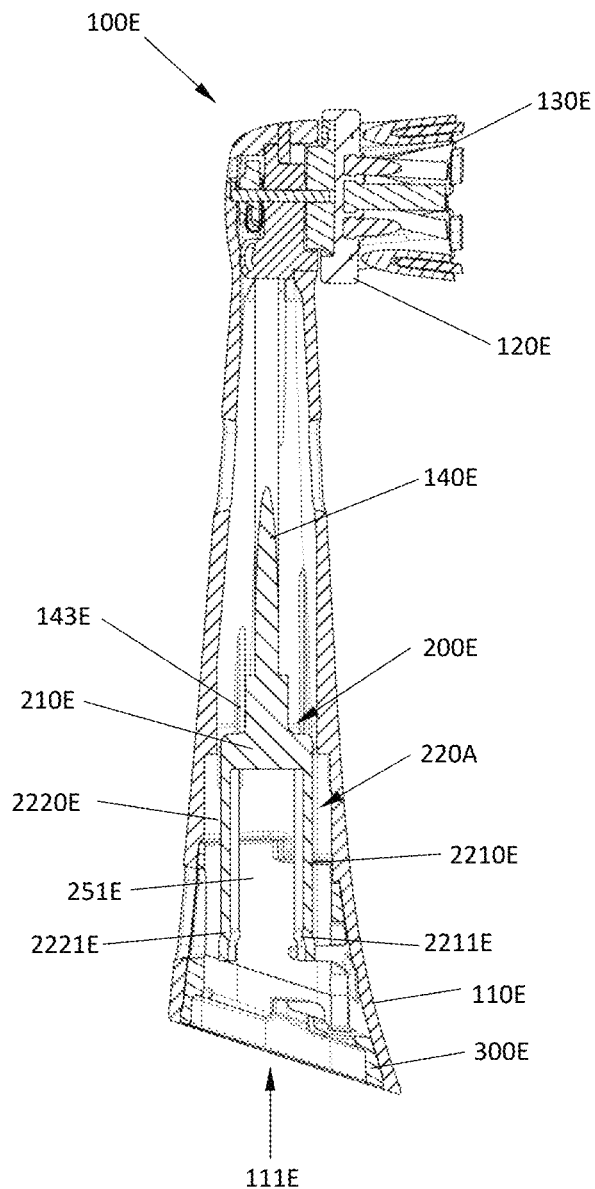
FIG. 9A is a cross-sectional depiction of a sixth example of an oral care device attachment as proposed in the present disclosure.
Figure 9B:
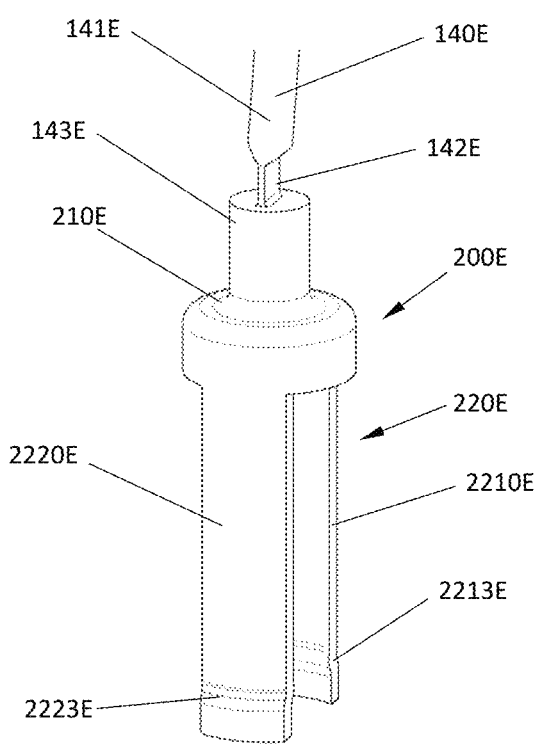
FIG. 9B is a depiction of a portion of a motion transmitter and of a coupling unit provided at a second end of the motion transmitter in accordance with the sixth example.

FIGS. 9A and 9B are depictions of a sixth example of an attachment 100E as proposed herein. This embodiment has some similarities with the embodiment shown in FIGS. 8A and 8B but here a top plate 210E and two deflectable wall elements 2210E and 2220E that define a virtual receiver cylinder 251E are together realized as an integral part, e.g., as a plastic injection molded part. The integral part may also comprise a motion transmitter 140E. The two deflectable wall elements 2210E and 2220E may again each comprise a radially inwards extending projection 2213E and 2223E, respectively, which in this embodiment may then be made in the plastic injection molding process.

FIGS. 10A and 10B are depictions of a seventh example of an attachment 100F as proposed herein. The attachment 100F comprises a coupling unit 200 that is detachably coupled with at least a portion of a motion transmitter 140F. More precisely, in the shown embodiment, a first portion 141F of the motion transmitter 140F ends with a first separable coupling part 1421F, which is separably coupled with a second separable coupling part 1422F, and the first and second separable coupling parts 1421F and 1422F together form a separable joint 142F which may be realized as a separable ball joint. The first separable coupling part 1421F is here realized as a spherical end portion of the first portion 141F of the motion transmitter 140F and the second separable coupling part 1422F here comprises several flexible arms that define a spherical receiver volume that can receive the spherical end portion.

The coupling unit 200F is here realized integral with the second separable coupling part 1422F and a second portion 143F of the motion transmitter 140F so that they together form a separable adaptor 400F and the adaptor 400F may be realized as a plastic injection molded part. The coupling unit 200F here comprises two deflectable wall elements 2210F and 2220F that define a virtual receiver cylinder 251F and each of the two deflectable wall elements 2210F and 2220F comprise a radially inwards extending projection 2213F and 2223F, respectively, that may be structured to only allow a one-time attachment to an essentially cylindrical drive shaft coupling end by engaging into an undercut. Once attached to the essentially cylindrical drive shaft coupling end, the coupling unit 200F may then only be removable by destroying the projections 2213F and 2223F.

Alternatively, the projections 2213F and 2223F may be shaped such that the coupling unit 200F can only be removed from the essentially cylindrical drive shaft coupling end by applying a relatively high force but without destroying the projections 2213F and 2223F—such removal force may be well above usual forces acting on the adaptor 400F during regular operation, e.g. the removal force may be above 15 N or above 20 N or above 25 N. The removal force should in particular be set higher than the separation force needed to separate the separable joint 142F. The basic idea here is that the integral part comprising the coupling unit 200F, the second portion of the motion transmitter 143F and the second separable coupling part 1422F remains attached to the essentially cylindrical drive shaft coupling end and the remainder of the attachment 100F can then be replaced when worn out or to attach a different attachment serving a different purpose.

FIGS. 11A and 11B are depictions of an eighth example of an attachment 100G as proposed herein. The eighth example embodiment is a combination of the seventh embodiment discussed with reference to FIGS. 10A and 10B and a spring 250G discussed with reference to FIGS. 6A and 6B relating to the third embodiment. This eighth embodiment is specifically provided as it shows that the various aspects discussed herein can be combined to the extent they are not mutually excluding.

FIGS. 12A and 12B are depictions of a ninth example of an attachment 100H as proposed herein. This ninth embodiment is a variant of the seventh embodiment with the separable pivot joint 142F, as the ninth embodiment also comprises a separable pivot joint 142H. But instead of two deflectable wall elements, a coupling section 200H of the ninth embodiment comprises a deformable essentially cylindrical wall element 220H that defines a cylindrical receiver volume 251H. The deformable essentially cylindrical wall element 220H may be made from an elastomeric material such as an artificial or natural rubber.

FIGS. 13A and 13B are depictions of a tenth example of an attachment 100I as proposed herein. The tenth embodiment deviates from all the discussed embodiment insofar as it does not comprise any wall element to define a cylindrical wall element. Instead, a coupling unit 200I only comprises a top plate 210I with a flat coupling surface 215I that is structured to become biased against a flat coupling surface of an essentially cylindrical drive shaft coupling end when the attachment 100I is attached to a handle. A spring 250I serves to apply the biasing force. As was described already, the spring 250I is arranged between an annular abutment projection on an inner side of an outer attachment tube 110I and the top plate 210I. The top plate 210I may be guided by an inner cylindrical portion 113I of the outer attachment tube 110I.

In addition to what is shown here, the top plate 210I may comprise one or several downwards extending alignment projections to establish a positional alignment between the flat coupling surface 215I and the coupling surface of the essentially cylindrical drive shaft coupling end. The spring 250I and the spring constant of the spring 250I should be chosen such that the flat coupling surface 215I always stays in contact with the coupling surface of the essentially cylindrical drive shaft coupling end. While a drive of the handle then needs to work against the spring 250I in the phase in which the drive shaft moves upwards and compresses the spring, this stored energy is again released when the spring support to push the drive shaft downwards. Only plastic deformations of the spring and conversion of motion into heat will then cause addition drive losses. This is also true for the other embodiments with a biasing spring.

Figure 14:
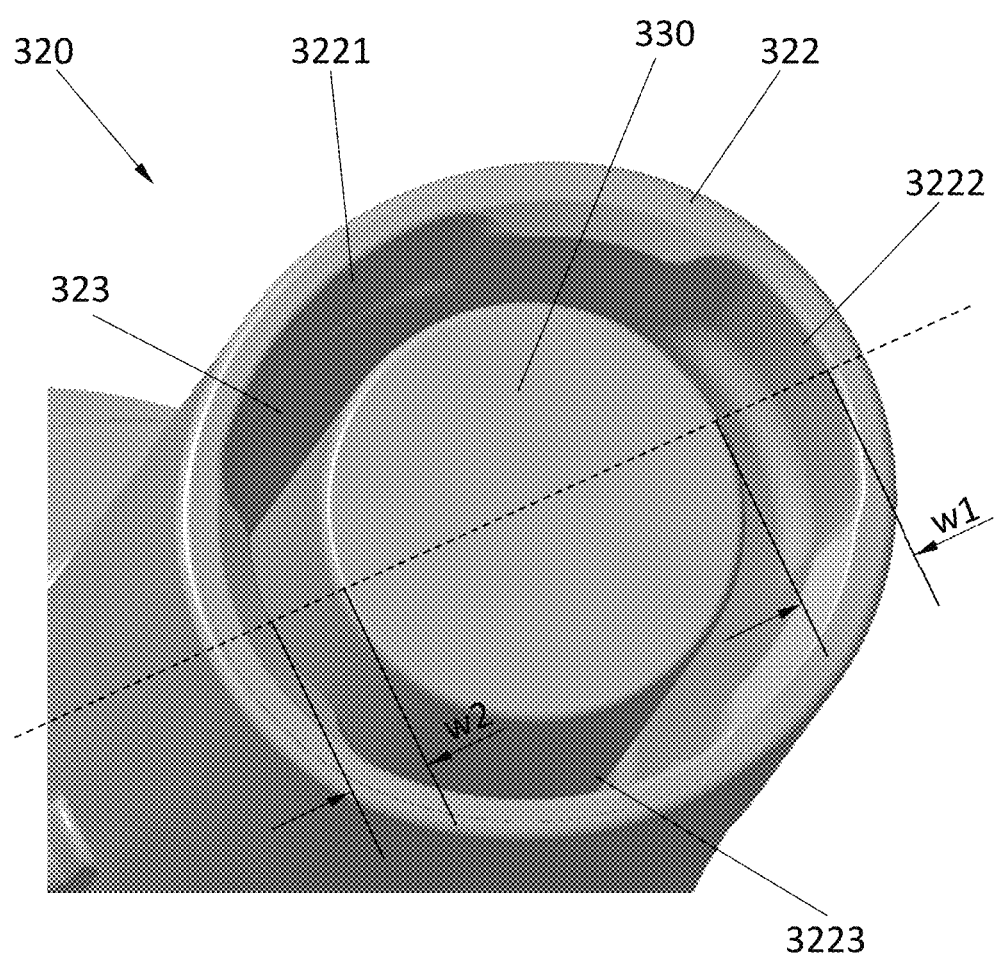
FIG. 14 is a perspective view onto a top end of an oral care handle comprising an essentially cylindrical drive shaft coupling end and a drive shaft housing.

FIG. 14 is a perspective view onto a coupling end of an oral care device handle 320 comprising an essentially cylindrical drive shaft coupling end 330 and a drive shaft housing 322.

As was already explained, the drive shaft housing may serve to mechanically receive an outer attachment tube of an oral care device attachment so that the two become detachably coupled with each other. The drive shaft housing 322 has a somewhat elongated cross-sectional shape, e.g., an elliptical or oval shape so that also an inner hollow of the drive shaft housing 322 accommodating the essentially cylindrical drive shaft coupling end 330 has an essentially elongated cross-sectional shape. Preferably, the essentially cylindrical drive shaft coupling end 330 is not coaxially or not centrically arranged in the hollow of the drive shaft housing 322, which leads to a gap 323 between the drive shaft housing 322 and the essentially cylindrical drive shaft coupling end 330 that has a non-constant width.

As is visualized in FIG. 14, a width of the gap 323 between the essentially cylindrical drive shaft coupling end 330 and the drive shaft housing 322 in a plane perpendicular to an extension axis of the drive shaft (see axis L in FIG. 3) may have a minimum value w1 and a maximum value w2, where in an example the minimum width w1 may be about 0.6 mm and the maximum width w2 may be about 1.0 mm. More generally, but still without limitation, a range of the minimum width w1 may be between 0.3 mm and 0.9 mm and a range for the maximum width w2 may be between 0.6 mm and 2.0 mm. The difference between the minimum width w1 and the maximum width w2 may be at least about 0.1 mm, preferably at least 0.2 mm and further preferably at least about 0.4 mm.

Alternatively or in addition to the eccentric arrangement between the essentially cylindrical drive shaft coupling end 330 and the drive shaft housing 322, the drive shaft housing 322 may comprise one or several pockets 3221, 3222, 3223 in its inner side wall. The at least one pocket 3221, 3222, 3223 may have a circumferential extension of at least about 10 degrees, preferably at least 20 degrees, more preferably at least about 30 degrees and even more preferably at least about 45 degrees. In some examples, the circumferential extension may be at least 60 degrees. In some examples, the drive shaft housing 322 may have two or three or four or five such pockets. In a preferred example, the drive shaft housing 322 has three pockets as is visualized in FIG. 14, even though the dimensions shown in FIG. 14 are exemplary only.

A length extension of the at least one pocket 3221, 3222, 3223 along the drive shaft extension axis (see axis L in FIG. 3) may be, without limitation, at least about 1 mm, preferably at least about 2 mm, further preferably at least about 3 mm and also preferably below about 20 mm. A depth of the pockets in the width direction of the gap 323 may be at least about 0.05 mm, preferably at least about 0.1 mm, more preferably at least about 0.15 mm and even more preferably at least about 0.2 mm.

The just described structure of the gap 322 between the essentially cylindrical drive shaft coupling end 330 and the drive shaft housing 320 may be reflected in the dimensions of an at least partly deformable essentially cylindrical wall element or of at least two elastic or deflectable wall elements, which elements were described already with reference to many embodiments. That means that, e.g., a width of the at least partly deformable essentially cylindrical wall element may vary in circumferential direction, using the available space provide by the gap. The at least partly deformable essentially cylindrical wall element may then have a smaller width where the width w1 of the gap 323 is minimal and may have a larger width where the width w2 of the gap 323 is maximum.

The practically chosen width may depend on the tolerance of the various elements and also on the side motion of the essentially cylindrical drive shaft end 330 during operation. The same holds true for a width or widths of at least two elastic or deflectable wall elements, where at least one of these wall elements may have a larger width than the other. It may be beneficial for the strength of the coupling to adapt the width of the wall element(s) to the available gap width. The wall element(s) may also adapt to the geometry provided by the at least one pocket 3221, 3222, 3223, i.e., the wall element(s) may have respective thickenings that may then project towards or even extend into the at least one pocket 3221, 3222, 3223.

With reference to the description of the embodiment shown in FIGS. 13A and 13B, the one or several downwards extending alignment projections to establish a positional alignment between the flat coupling surface 215I and the coupling surface of the essentially cylindrical drive shaft coupling end may be dimensioned such that they extend into the space provided by the at least one pocket 3221, 3222, 3223 or such that they are at least in positional alignment with the at least one pocket 3221, 3222, 3223 so that the increased width of the gap avoids a collision between the projections and the inner side wall of the drive shaft housing 322. In an example, the drive shaft housing 322 comprises three pockets 3221, 3222, 3223 that are preferably evenly distributed in circumferential direction and the oral care device attachment comprises in circumferential direction three evenly distributed downwards extending alignment projections to establish a positional alignment between the flat coupling surface and the coupling surface of the essentially cylindrical drive shaft coupling end.

In accordance with an aspect, an oral care device attachment for being coupled to an oral care device handle having an essentially cylindrical drive shaft coupling end is proposed, where the attachment comprises an outer attachment tube having a coupling end that is intended for being detachably secured at a housing of the oral care device handle, a carrier being mounted for driven motion at the outer attachment tube, a motion transmitter being disposed inside of the outer attachment tube, the motion transmitter having a first end coupled with the carrier and a second end being arranged for coupling with the essentially cylindrical drive shaft coupling end, the second end comprising a coupling unit having a top plate and one elastic or deflectable wall element extending from the top plate, wherein the elastic or deflectable wall element comprises an inwards projecting protrusion.

The aspect as described in the previous paragraph may be arranged so that the one elastic or deflectable wall element is in positional alignment with a maximum width of the gap between the essentially cylindrical drive shaft coupling end and the drive shaft housing. In such an example, the coupling unit may be at least part of a separable adaptor, preferably wherein at least a part of the motion transmitter and the separable adaptor are coupled by a separable coupling such as a separable ball joint. This allows to first introduce the separable adaptor with the one elastic or deflectable wall element into the maximum width gap area until the inwards projecting protrusion snaps into an undercut of the essentially cylindrical drive shaft coupling end and then to turn the separable adaptor into a position where the one elastic or deflectable wall element extends through a smaller width gap area and may then not easily become detached from the essentially cylindrical drive shaft coupling end due to lack of available gap width for the detachment prior to turning the separable adaptor back into a position where the one elastic or deflectable wall element extends again through the wider width gap portion. Other elements as described in this disclosure may also be added to this aspect, e.g., the biasing spring.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An oral care device attachment for being coupled to an oral care device handle, the oral care device attachment comprising:
    an outer attachment tube having a coupling end that is intended for being secured at the oral care device handle;
    a carrier mounted for driven motion at the outer attachment tube;
    an axle engaged to the carrier, wherein the driven motion of the carrier is an oscillatory rotation about a rotation axis defined by the axle;
    a motion transmitter disposed inside of the outer attachment tube, the motion transmitter comprising a first end coupled with the carrier and a second end comprising a coupling unit that has a top plate and a first solid coupling surface configured to engage a flat second coupling surface at an end of a drive shaft of the oral care device handle with the oral care device attachment coupled to the oral care device handle, wherein the coupling unit does not receive any portion of the drive shaft therein; and
    a spring engaging the top plate and biasing the motion transmitter towards the coupling end of the outer attachment tube.

2. The oral care device attachment of claim 1, wherein the spring is positioned between the outer attachment tube and the motion transmitter.

3. The oral care device attachment of claim 1, wherein the spring biases the motion transmitter towards the coupling end of the outer attachment tube such that the first coupling surface of the coupling unit always stays in contact with the flat second coupling surface of the drive shaft with the oral care device attachment coupled to the oral care device handle.

4. The oral care device attachment of claim 1, wherein the spring is a coil spring that encircles at least a portion of the motion transmitter.

5. The oral care device attachment of claim 1, wherein the first coupling surface of the coupling unit and the flat second coupling surface of the drive shaft do not magnetically interact.

6. The oral care device attachment of claim 1, wherein an end of the spring abuts a top abutment surface of the top plate.

7. The oral care device attachment of claim 1, wherein the rotation axis defined by the axle is substantially orthogonal to a longitudinal axis of the oral care device attachment and the oral care device handle.

8. The oral care device attachment of claim 1, wherein: the oral care device attachment is a replaceable brush head; and the carrier comprises a plurality of bristle tufts.

9. The oral care device attachment of claim 1, wherein the coupling unit is integral with the motion transmitter.

10. The oral care device attachment of claim 1, wherein the first coupling surface is flat and extends generally perpendicular to a longitudinal axis of the oral care device attachment and the oral care device handle.

11. The oral care device attachment of claim 1, wherein engagement between the first coupling surface and the flat second coupling surface transmits linear reciprocation of the drive shaft to the motion transmitter.

12. An oral care device attachment for being coupled to an oral care device handle, the oral care device attachment comprising:
an outer attachment tube having a coupling end that is intended for being secured at the oral care device handle;
a carrier mounted for driven motion at the outer attachment tube;
an axle engaged to the carrier, wherein the driven motion of the carrier is an oscillatory rotation about a rotation axis defined by the axle;
a motion transmitter disposed inside of the outer attachment tube, the motion transmitter comprising a first end coupled with the carrier and a second end that has a first solid coupling surface and configured to engage a flat second coupling surface at an end of a drive shaft of the oral care device handle with the oral care device attachment coupled to the oral care device handle, wherein the first solid coupling surface at the second end of the motion transmitter does not receive any portion of the drive shaft therein; and
a spring biasing the motion transmitter towards the coupling end of the outer attachment tube.

13. The oral care device attachment of claim 12, wherein the spring is positioned between the outer attachment tube and the motion transmitter.

14. The oral care device attachment of claim 12, wherein the spring biases the motion transmitter towards the coupling end of the outer attachment tube such that the first coupling surface of the motion transmitter always stays in contact with the flat second coupling surface of the drive shaft with the oral care device attachment coupled to the oral care device handle.

15. The oral care device attachment of claim 12, wherein the spring is a coil spring that encircles at least a portion of the motion transmitter.

16. The oral care device attachment of claim 12, wherein the first coupling surface of the motion transmitter and the flat second coupling surface of the drive shaft do not magnetically interact.

17. The oral care device attachment of claim 12, wherein the rotation axis defined by the axle is substantially orthogonal to a longitudinal axis of the oral care device attachment and the oral care device handle.

18. The oral care device attachment of claim 12, wherein: the oral care device attachment is a replaceable brush head; and the carrier comprises a plurality of bristle tufts.

19. The oral care device attachment of claim 12, wherein the second end of the motion transmitter is integral with the first end of the motion transmitter.

20. The oral care device attachment of claim 12, wherein the first coupling surface is flat and extends generally perpendicular to a longitudinal axis of the oral care device attachment and the oral care device handle.

21. The oral care device attachment of claim 12, wherein engagement between the first coupling surface and the flat second coupling surface transmits linear reciprocation of the drive shaft to the motion transmitter.

22. An oral care device attachment for being coupled to an oral care device handle, the oral care device attachment comprising:
an outer attachment tube having a coupling end that is intended for being secured at the oral care device handle;
a carrier mounted for driven motion at the outer attachment tube;
an axle engaged to the carrier, wherein the driven motion of the carrier is an oscillatory rotation about a rotation axis defined by the axle;
a motion transmitter disposed inside of the outer attachment tube, the motion transmitter has a first end coupled with the carrier and a second end comprising a solid coupling unit that has a means for engaging a flat coupling surface at an end of a drive shaft of the oral care device handle with the oral care device attachment coupled to the oral care device handle, wherein the solid coupling unit at the second end of the motion transmitter does not receive any portion of the drive shaft therein; and
a spring biasing the motion transmitter towards the coupling end of the outer attachment tube.

23. The oral care device attachment of claim 22, wherein the spring is positioned between the outer attachment tube and the motion transmitter.

24. The oral care device attachment of claim 22, wherein the spring biases the motion transmitter away from the carrier such that the means for engaging the flat coupling surface of the drive shaft of the oral care device handle always stays in contact with the flat coupling surface of the drive shaft with the oral care device attachment coupled to the oral care device handle.

25. The oral care device attachment of claim 22, wherein the spring is a coil spring that encircles at least a portion of the motion transmitter.

26. The oral care device attachment of claim 22, wherein the means for engaging the flat coupling surface of the drive shaft of the oral care device handle and the flat coupling surface of the drive shaft do not magnetically interact.

27. The oral care device attachment of claim 22, wherein the rotation axis defined by the axle is substantially orthogonal to a longitudinal axis of the oral care device attachment and the oral care device handle.

28. The oral care device attachment of claim 22, wherein: the oral care device attachment is a replaceable brush head; and the carrier comprises a plurality of bristle tufts.

29. The oral care device attachment of claim 22, wherein the coupling unit is integral with the motion transmitter.

30. The oral care device attachment of claim 22, wherein engagement between the means for engaging the flat coupling surface at the end of the drive shaft of the oral care device handle and the flat coupling surface at the end of the drive shaft of the oral care device handle transmits linear reciprocation of the drive shaft to the motion transmitter.

\* \* \* \* \*